United States Patent
Lange

[11] 4,016,581
[45] Apr. 5, 1977

[54] SHUTTER DRIVE SYNCHRONOUSLY SET WITH FILM FRAME AND FLASH CUBE SET

[75] Inventor: Karl Heinz Lange, Bunde, Germany

[73] Assignee: Balda-Werke, Germany

[22] Filed: Sept. 12, 1975

[21] Appl. No.: 612,998

[30] Foreign Application Priority Data

Sept. 26, 1974 Germany .......................... 2446084

[52] U.S. Cl. .............................................. 354/144
[51] Int. Cl.$^2$ .......................................... G03B 15/03
[58] Field of Search ................... 354/139, 141–144, 354/148, 149

[56] References Cited
UNITED STATES PATENTS

| | | | |
|---|---|---|---|
| 3,353,467 | 11/1967 | Ernisse et al. | 354/139 |
| 3,463,068 | 8/1969 | Engelsmann et al. | 354/144 |
| 3,687,033 | 8/1972 | Beach | 354/142 |
| 3,714,877 | 2/1973 | Schroder | 354/144 |
| 3,735,679 | 5/1973 | Winkler | 354/141 |
| 3,882,519 | 5/1975 | Winkler et al. | 354/141 |

Primary Examiner—Donald A. Griffin
Attorney, Agent, or Firm—Blum, Moscovitz, Friedman & Kaplan

[57] ABSTRACT

A shutter type flash camera is provided with novel means for synchronously setting the shutter drive thereof as the camera film transport mechanism is set to a next unexposed frame, while a flash cube mounting is simultaneously rotated to a next sequential position. The film transport mechanism includes an external gear rotatably mounted on the camera housing. In mesh therewith is a second gear having external and internal gearing. The mesh between the first and second gears occurs between the external gearing of both. Eccentrically mounted within the second gear is a smaller external third gear which meshes with the internal gearing of the second gear. A crescent shaped space is defined between the second and third gears. As the first gear mounted on the film transport mechanism is rotated counterclockwise, the second and third gears are correspondingly rotated in a clockwise position. Mounted on the underside surface of the second gear are a plurality of cams in relative spaced relationship. The cams cooperate with a centrifugal lever mounted in the camera shuttering mechanism for releasing the camera shutter whereby an exposure occurs. The centrifugal lever is also cooperatively connected to an ignition plunger which is shifted to a second ignition position for igniting the flash cube as the shutter is simultaneously released, the second position being in the crescent shaped space.

14 Claims, 3 Drawing Figures

SHUTTER DRIVE SYNCHRONOUSLY SET WITH FILM FRAME AND FLASH CUBE SET

BACKGROUND OF THE INVENTION

The instant invention relates generally to a driving mechanism for a shutter type flash camera. More particularly, this invention relates to a shutter actuating mechanism which is synchronously set for shuttering the camera when the camera film transport mechanism is set to a next unexposed frame, simultaneously with rotating a flash cube to a next unused position.

Prior cameras having a similar type of operational sequences are generally bulky, awkward and unattractive, because means for simulating this operational sequence are themselves bulky and space consuming. Therefore, the instant invention provides novel mechanical means for synchronously setting the shutter drive and flash cube position in a camera as the film transport mechanism thereof is set to a next unexposed frame.

SUMMARY OF THE INVENTION

Generally speaking, in accordance with the invention a shutter type flash camera is provided with novel means for synchronously setting the shutter drive thereof as the camera film transport mechanism is set to a next unexposed frame, while a flash cube mounting is simultaneously rotated to a next sequential position. The film transport mechanism includes an external gear rotatably mounted on the camera housing. In mesh therewith is a second gear having external and internal gearing. The mesh between the first and second gears occurs between the external gearing of both. Eccentrically mounted within the second gear is a smaller external third gear which meshes with the internal gearing of the second gear. Between the second and third gears, a crescent shaped space is defined. As the first gear mounted on the film transport mechanism is rotated counterclockwise, the second and third gears are correspondingly rotated in a clockwise position.

Mounted on the underside surface of the second gear are a plurality of cams in relative spaced relationship. The cams cooperate with a centrifugal lever mounted in the camera shuttering mechanism for releasing the camera shutter whereby an exposure occurs. The centrifugal lever is also cooperatively connected to an ignition plunger which is shifted to a second ignition position for igniting the flash cube as the shutter is simultaneously released, the second position thereof being in the crescent shaped space.

Accordingly, it is an object of the invention to provide novel means for operatively synchronously connecting the film transport mechanism of a camera with the shuttering mechanism and flash cube mounting thereof.

It is still another object of the invention to provide novel means for operatively connecting the shutter drive mechanism of a camera and the flash cube ignition plunger thereof for igniting the flash lamp as the camera shutter is released.

It is yet another object of the invention to provide novel means for operatively connecting the film transport mechanism of a camera with the flash cube mounting thereof.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE INVENTION

Figures 1, 2:
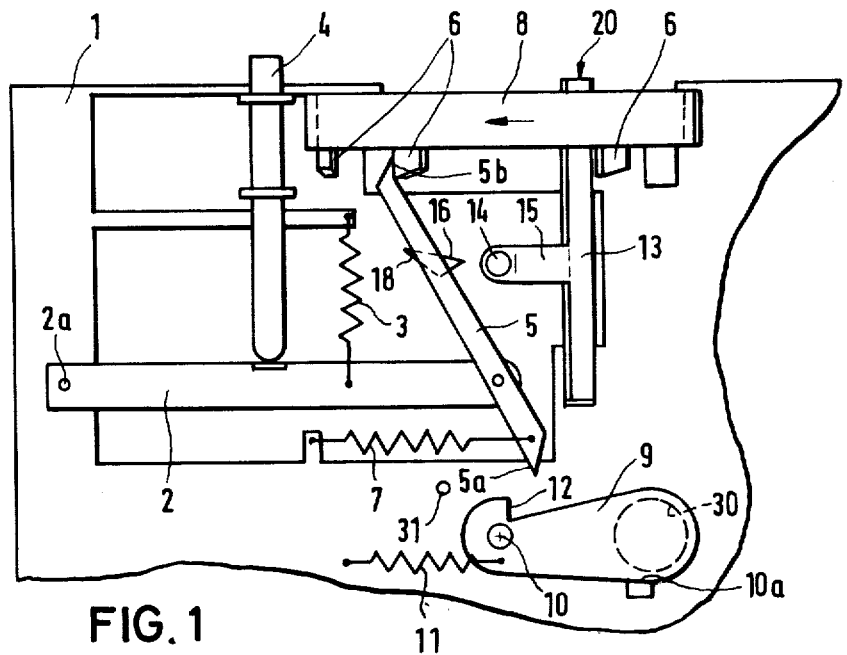
FIG. 1 is a schematic representation of a driving mechanism for a shutter type flash camera constructed in accordance with the instant invention.
FIG. 2 shows the driving mechanism embodiment seen in FIG. 1 with the shutter in a released position.

Referring now to the drawing, a reciprocable lever 2 is pivotally mounted on a camera housing 1 by a stud 2a. Lever 2 is reciprocable between first and second positions, but is normally biased counterclockwise into its first position, as best seen in FIG. 1, by a spring 3 connected at one end to reciprocable lever 2 and to camera housing 1 at its other end. A shutter release knob 4 slidably mounted on camera housing 1 between first and second positions operatively engages reciprocable lever 2, and the first and second positions thereof correspond with the respective first and second positions of reciprocable lever 2.

A centrifugal lever 5 is pivotally connected to the free end of reciprocable lever 2, for instance, by a stud. As seen in FIG. 1, the shorter arm 5a of centrifugal lever 5 has a clockwise bias provided by a spring 7 connected at one end to arm 5a and to camera housing 1 at its other end, for thereby normally biasing the longer arm 5b of centrifugal lever 5 against one of a plurality of switching cams 6 mounted on a rotatable gear 8, hereinafter described in detail.

In spaced relationship from arm 5a of centrifugal lever 5 is a pivotable shutter plate 9 which is reciprocable between first and second positions due to the bias of spring 11 connected at one end to shutter plate 9 and connected to housing 1 at its other end. Shutter plate 9 may be pivotally connected to housing 1 by a journal 10. In the first or closed position of shutter plate 9, as best seen in FIG. 1, shutter plate 9 overlies the camera diaphragm aperture 30 provided in the housing. A hub 10a is mounted on housing 1 in spaced relationship relative to diaphragm aperture 30 and provides a stopper against which shutter plate 9 abuts in its first position, thereby determining the maximum clockwise reciprocation of shutter plate 9 on journal 10.

Shutter plate 9 includes an elbow 12 provided with a camming surface into which arm 5a of centrifugal lever 5 abuts as the shutter drive is released by sliding release knob 4 from its first to second positions, for instance by exerting downward manual pressure thereon. As arm 5a abuts elbow 12 of shutter plate 9 and cams on the surface thereof, shutter plate 9 pivots counterclockwise on journal 10 against the bias of spring 11 to its second position. The counterclockwise pivotable movement of shutter plate 9 on journal 10 uncovers diaphragm aperture 30, as best seen in FIG. 2. The bias on shutter plate 9 exerts a clockwise moment thereon and arm 5a cams on the surface of elbow 12 until it disengages therefrom. The clockwise reciprocation of shutter plate 9 returns shutter plate 9 to its first position overlying diaphragm aperture 30.

Also in spaced relationship from arm 5b of centrifugal lever 5 is a plunger 13 slidably mounted in housing 1 between a first position seen in FIG. 1 and a second position seen in FIG. 2. Plunger 13 includes a medial lateral extension 15 having a nub 14 perpendicularly mounted on the end thereof. Overlying plunger 13 is an ignition striker spring 20 indicated but not shown. Plunger 13 is an ignition type plunger for type X or "Magicube" type percussion lamps. With these types of percussion - ignition lamps, plunger 13 enters the base of the flash cube and releases a pre-loaded spring or striker which strikes an ignition cap to flash the bulb.

As centrifugal lever 5 uncovers a diaphragm aperture 30, it simultaneously displaces plunger 13 upwardly from its first to second positions. Mounted on arm 5b in spaced relationship relative to nub 14 is a cam 18 having an inclined camming surface 16. As arm 5b of centrifugal lever 5 is biased clockwise on its pivot, nub 14 abuts cam 18 and cams along the inclined surface 16 thereof thereby displacing plunger 13 upwardly to its second position. In its second position, plunger 13 releases the striker spring 20 which ignites the flash lamp.

The general operation of the device may be seen with reference to FIGS. 1 and 2. It is understood in the description of the device that the description of the movements of parts is relative and suited to the views seen in FIGS. 1 and 2. As downward pressure is applied on release knob 4 to shift it from its first to second positions, reciprocable lever 2 correspondingly pivots to its respective second position seen in FIG. 2 from its first position seen in FIG. 1 against the bias of spring 3.

As reciprocable lever 2 pivots to its second position arm 5b of centrifugal lever 5 cams downwardly along the surface of a cam 6 until it is released therefrom. The bias of spring 7 on arm 5a of centrifugal lever 5 pivots centrifugal lever 5 after arm 5b thereof is free of a cam 6. Centrifugal lever 5 is moved downwardly by reciprocable lever 2 as it pivots so as to synchronously pivot shutter plate 9 to a second position for uncovering diaphragm aperture 30 and for longitudinally displacing plunger 13 into contact with spring 20 for igniting the flash lamp.

When centrifugal lever 5 is pivoted so that arm 5a thereof abuts hub 31, shutter plate 9 is released therefrom in the manner heretofore described and shutter plate 9 is reciprocably biased to its first position by spring 11. At about or prior to the time that arm 5a of centrifugal lever 5 abuts hub 31, nub 14 of plunger 13 ascends inclined camming surface 16 of cam 18 and, simultaneously, plunger 13 returns to its first position while arm 5b of centrifugal lever 5 resumes its clockwise pivot, generally designated by directional arrow 19, and with the return of release knob 4 to its first upward position, arm 5b of centrifugal lever 5 abuts another cam 6.

Figure 3:
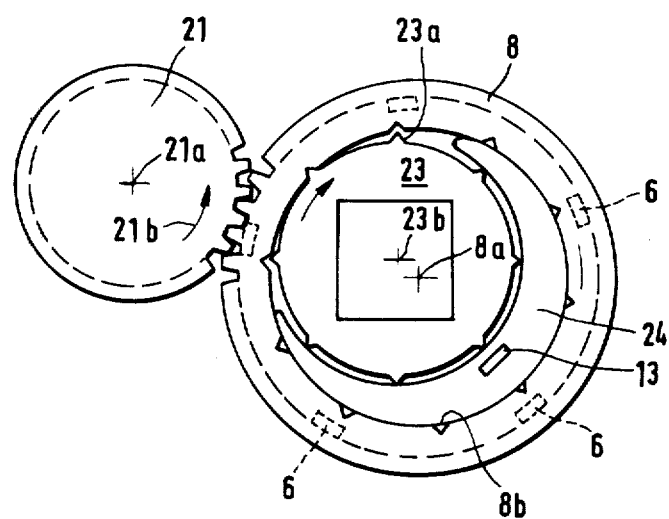
FIG. 3 is a top plan view of the embodiment seen in FIG. 1 showing in detail the gearing arrangement of the flash mounting and film transport mechanism.

As best seen in FIG. 3, cams 6 depend downwardly from a gear 8 provided with external gearing and internal gearing 8b. Gear 8 is rotatably mounted in camera housing 1, and is rotatable about an axis 8a. Eccentrically mounted within gear 8 on housing 1 is an external gear 23 rotatable about an axis 23b. A crescent space 24 is defined between eccentric gears 8 and 23. Mounted on gear 23 is the flash cube assembly for the camera. Gear teeth of gear 23 mesh with the internal gearing of gear 8. In mesh with the external gearing of gear 8 is a gear 21 rotatably mounted on the film transport assembly in camera housing 1. As the film transport assembly is rotated to a next unexposed film frame, gear 21 is rotated about an axis 21a in the direction shown by arrow 21b. As gear 21 is rotated counterclockwise gears 8 and 23 are correspondingly rotated clockwise. The flash cube assembly is thereby correspondingly rotated to a next unexposed facet as the blank film frame is synchronously set in the camera. As best seen with reference to FIGS. 1-3, the film transport gear 21 resets centrifugal lever 5 to the position seen in FIG. 1 when the film is wound to expose a next unused film frame. During the shuttering operation, gear 8 is stationary and arm 5b of centrifugal lever 5 abuts a first cam 6. After the shutter release, arm 5b of centrifugal lever 5 abuts against the next succeeding cam 6 on gear 8 according to the clockwise rotation of gear 8. When it is desired to reset the camera to a new film frame, gear 21 is rotated counterclockwise, while gear 8 is rotated clockwise thereby resetting lever 5 to the position seen in FIG. 1. The position of plunger 13 relative to the corresponding positions of gears 8 and 23 as mounted in camera housing 1 may be seen in FIG. 3.

The eccentric drive provided by gears 8 and 23 for the flash cube assembly and the crescent slot 24 between gears 8 and 23 for plunger 13 are significant aspects of constructions within the scope of this invention. In prior constructions employing a concentric drive, it was only possible to provide a gear analogous to gear 8 with four cams moving through the 90° necessary to rotate a flash cube to a next in use position. In the concentric drive assembly, the distance through which the cams travelled and the arc through which the cams were rotated exceeded the distance necessary for cocking or resetting the shutter. To overcome this problem, the cams had to be arranged closer to the gear axis. While this arrangement overcame one problem, it created another problem in that the new location of the cams interfered with the operation of the ignition plunger. Therefore, the eccentric gear arrangement within the scope of this invention overcomes the problems heretofore encountered with concentric drive assemblies.

The film transport assembly may be of conventional construction and the particular construction details thereof do not form any aspect of this invention. The camera may be adapted to utilize cartridge load or roll film without any affect upon the constructions set forth herein. While it is an aspect of the invention that the driving mechanism may be utilized in conjunction with a camera having a flash cube assembly, it is apparent that there may be times when it is undesirable to use a flash cube in the assembly, for instance for outdoors, daylight snapshots.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a camera of the type including a housing and a shuttered objective, flash cube assembly, and film transport assembly mounted in the housing, the improvement comprising a shutter release assembly mounted in the camera housing, said shutter release assembly comprising a reciprocable shutter plate pivotally mounted in said camera housing, said shutter plate being reciprocable between first and second positions, said shutter plate having a first position overlying the objective, means connected to said shutter plate for normally biasing said shutter plate into its first position, a pivotally mounted centrifugal lever having a longer lever arm and a shorter lever arm, means biasing said shorter lever arm towards said shutter plate, means releasably abutting said longer lever arm for prepositioning said centrifugal lever, said shorter lever arm being pivotally engageable with said shutter plate for pivoting said shutter plate to said second position thereof against the normal bias thereon when said longer lever arm is released from said last-mentioned means, means for pivotally supporting said centrifugal lever in said camera housing, said shorter lever arm being normally supported a predetermined distance from said shutter plate, means cooperatively connected to said support means for simultaneously releasing said longer lever arm from said abutment means and arranging said supported shorter lever arm in the path of said shutter plate so as to permit said shorter lever arm to abut said shutter plate and pivot said shutter plate from said first position to said second position thereof, and means mounted in said camera housing for synchronously resetting the shutter release assembly, said means including an eccentric drive for rotating the flash cube assembly as film is transported by the film transport assembly to show a next unexposed frame of film.

2. The improvement as claimed in claim 1, said means connected to said shutter plate for normally biasing said shutter plate into its first position comprising a spring having an end connected to said shutter plate and another end connected to said camera housing.

3. The improvement as claimed in claim 1, said means biasing said shorter lever arm towards said shutter plate comprising a spring having an end connected to said shorter lever arm and another end connected to said camera housing.

4. The improvement as claimed in claim 1, said means releasably abutting said longer lever arm for prepositioning said centrifugal lever comprising a plurality of discrete cams rotatably mounted in said camera housing, each respective cam being arranged a predetermined distance from each other cam, said predetermined distance between said cams corresponding to a predetermined prepositioned path through which said centrifugal lever is reset after said shutter plate is released, each of said cams having a camming surface, said longer lever arm of said centrifugal lever abutting said camming surface of a said cam when said shutter plate is in said first position, said longer lever arm including means for camming along said camming surface of a said cam.

5. The improvement as claimed in claim 1, said means for pivotally supporting said centrifugal lever in said camera housing comprising a driven lever having an end pivotally mounted in said camera housing and a free end, said driven lever being reciprocable between a normal first position and a second position, said centrifugal lever being pivotally mounted on said free end of said driven lever.

6. The improvement as claimed in claim 1 said means cooperatively connected to said support means for simultaneously releasing said longer lever arm from said abutment means and arranging said supported shorter lever arm in the path of said shutter plate comprising a release member cooperatively connected to said support means, said release member being slidably mounted in said camera housing, said release member being slidable between first and second positions, and said support means being correspondingly reciprocable between first and second positions.

7. The improvement as claimed in claim 1 including a hub mounted in said camera housing, said shutter plate abutting said hub when said shutter plate is in its first position.

8. In a camera of the type including a housing and a shuttered objective, flash cube assembly, and film transport assembly mounted in the housing, the improvement comprising a shutter release assembly mounted in the camera housing, means mounted in said camera housing for synchronously resetting the shutter release assembly, said means including an eccentric drive for rotating the flash cube assembly as film is transported by the film transport assembly to show a next unexposed frame of film, said means including a first gear having internal and external gearing rotatably mounted in said camera housing, a plurality of discrete cam means mounted on said first gear for prepositioning and resetting said shutter release assembly, said flash cube assembly including an external gear eccentrically mounted within said first gear and in mesh with said internal gearing thereof, said external gear and said first gear having a crescent slot therebetween, and said firlm transport assembly including an external gear rotatably mounted in said camera housing in mesh with said external gearing of said first gear, said external gear included in said film transport assembly being rotatable in a first direction and said first gear and said gear included in said flash cube assembly being respectively rotatable in a corresponding first direction which is opposite to the direction of rotation of said external gear included in said film transport assembly.

9. The improvement as claimed in claim 8 including a reciprocable ignition plunger slidable between first and second positions mounted in said camera housing, said plunger having a second position in the plane of said crescent shaped slot, said shutter release assembly including means coacting with said ignition plunger for sliding said ignition plunger from its first to its second positions.

10. In a camera of the type including a housing and a shuttered objective, flash cube assembly, and film transport assembly mounted in the housing, the improvement comprising a shutter release assembly mounted in the camera housing, and means mounted in said camera housing for synchronously resetting the shutter release assembly and for rotating the flash cube assembly as film is transported by the film transport assembly to show a next unexposed frame of film, said means including an intermediate wheel rotatably mounted to said housing adapted for operative coupling with and rotative driving by said film transport assembly, means for rotating said flash cube assembly, said flash cube assembly rotating means mounted within said intermediate wheel for cooperative interengagement with said intermediate wheel, the axes of rotation of said intermediate wheel and said flash cube assembly being non-concentric.

11. The improvement as claimed in claim 10, further including a reciprocable ignition plunger selectively displaceable between first and second positions, said plunger mounted to said housing within said intermediate wheel and without said flash cube assembly rotating means, said shutter release assembly including means coacting with said reciprocable ignition plunger for displacing said reciprocable ignition plunger from said first to said second positions.

12. The improvement as claimed in claim 10, further including cam means, said cam means mounted on said intermediate wheel for prepositioning and releasing said shutter assembly.

13. The improvement as claimed in claim 10, wherein said cooperative interengagement of said intermediate wheel and said flash cube assembly rotating means comprises internal gear teeth mounted on said intermediate wheel and said flash cube assembly rotating means comprising gear means in mesh with said internal teeth mounted on said intermediate wheel cooperatively coupled for rotation with said flash cube assembly.

14. The improvement as claimed in claim 10, wherein said operative coupling and rotative driving of said intermediate wheel comprises gear means coupled to said film transport assembly and gear teeth mounted externally on said intermediate wheel in mesh with said gear means of said film transport assembly for rotating said intermediate wheel.

* * * * *